US006239879B1

(12) United States Patent
Hay

(10) Patent No.: US 6,239,879 B1
(45) Date of Patent: May 29, 2001

(54) NON-CONTACTING COMMUNICATION AND POWER INTERFACE BETWEEN A PRINTING ENGINE AND PERIPHERAL SYSTEMS ATTACHED TO REPLACEABLE PRINTER COMPONENT

(75) Inventor: Robert R. Hay, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/124,950

(22) Filed: Jul. 29, 1998

(51) Int. Cl.[7] .................. G06F 15/00

(52) U.S. Cl. .................. 358/1.15; 358/1.1; 347/214; 347/216; 399/89; 399/90

(58) Field of Search .................. 358/1.1, 1.12, 358/1.14, 1.13, 1.15; 399/37, 88, 89, 90, 336; 355/27, 36; 347/86, 214, 216, 19

(56) References Cited

U.S. PATENT DOCUMENTS

| | | | |
|---|---|---|---|
| 4,781,716 | 11/1988 | Richelsoph | 623/3 |
| 5,184,181 | * 2/1993 | Kurando et al. | 355/260 |
| 5,276,398 | * 1/1994 | Withers et al. | 324/318 |
| 5,589,859 | * 12/1996 | Schantz | 347/19 |
| 5,682,575 | * 10/1997 | Komori | 399/66 |

OTHER PUBLICATIONS

Pending U.S. Patent application Ser. No.: 08/995664; filed Dec. 19, 1997; Title: Electronic Printer Having Wireless Power and Communications Connections to Acccessory Units.

* cited by examiner

*Primary Examiner*—Edward Coles
*Assistant Examiner*—Mark Wallerson

(57) ABSTRACT

Contactless power and communications links are established between a printer engine and a peripheral device installed on a replaceable printer component. For peripheral devices incorporated within or on the replaceable component, power is inductively transferred from a primary winding on the printer engine to an adjacent secondary winding on the replaceable component without the use of direct physical contact between electrical conductors. In addition, communications between the printer engine and at least one peripheral device on board the replaceable component are provided without making direct physical contact between electrical conductors. The communication task is accomplished in one of several ways. For a first embodiment of the invention, control signals are sent from the printer engine to the replaceable component over the inductive power coupling circuit by switching between two frequencies of alternating current applied to the primary winding on the printing engine. The frequency switching is decoded on board the replaceable component to provide control signals for the peripheral device. For communications in the opposite direction, the peripheral device may send information to the printer engine by modulating a resistive load coupled to the secondary winding. Current flow through the primary winding will vary in response to the load on the secondary winding. The variations in current flow on the printer engine side are decoded to signals which the printer engine comprehends. For a second embodiment of the invention, signals are inductively transmitted across a narrow gap. For a third embodiment of the invention, communications are handled by transmitting and receiving modulated infrared energy across a narrow gap.

16 Claims, 6 Drawing Sheets

NON-CONTACTING COMMUNICATION AND POWER INTERFACE BETWEEN A PRINTING ENGINE AND PERIPHERAL SYSTEMS ATTACHED TO REPLACEABLE PRINTER COMPONENT

RELATED APPLICATIONS

This application is related to application Ser. No. 08/995,664 that was filed on Dec. 19, 1997 and is titled ELECTRONIC PRINTER HAVING WIRELESS POWER AND COMMUNICATIONS CONNECTIONS TO ACCESSORY UNITS.

FIELD OF THE INVENTION

This invention relates to electronic printers and, more particularly, to printers having attached accessory units which require power and communications connections between the printer and accessory unit.

BACKGROUND OF THE INVENTION

The past twenty years have witnessed an incredible variety of printers designed for digital computers. For years, the line printer was the mainstay of the computer industry. Then, in the mid-1970's, the personal computer revolution began with the appearance of primitive computers based on the S-100 bus. With the appearance of more user-friendly computers from Apple Computer and, later, from IBM Corporation, the demand for personal computers soared. The public's almost insatiable appetite for personal computers has spawned a virtual explosion of technology. Printer technology has been one of the principal beneficiaries of that technology explosion. Early on, dot-matrix printers grabbed the lion's share of the market. For less than a decade, daisywheel printers shared the limelight for letter-quality printing tasks. Thermal printers were briefly used for portable applications. High-resolution dot-matrix printers and ink-jet printers sounded the death knell for daisywheel printers. Though greatly reduced in number, dot matrix printers seem to have found a niche for multiple form printing applications.

Laser computer printers have been around almost since the beginning of the personal computer revolution. In late 1980, Xerox Corporation introduced a laser printer for mainframe computers. Retail priced at a lofty $298,000, it could print more than 30 pages a minute. However, it was not until the Hewlett Packard Company began marketing the LaserJet series of laser printers that laser printers for personal computers became commonplace. Color laser printers, which are now becoming more affordable, may eventually become as ubiquitous as the black-and-white laser printers.

Modern electronic printers (especially those employing laser copying technology) are generally equipped with at least one replaceable component, such as a toner cartridge. Frequently, there is a need to install a peripheral device on the replaceable component. Such peripheral device may include, without limitation, a microprocessor, a non-volatile memory, a toner quantity sensor, an environmental condition sensor, a photoconductor condition sensor, or a print quality sensor. Each such device would generally require some sort of power source and would need to communicate with the printer engine. Current approaches to providing connectivity between a host printer engine and a peripheral device on the replaceable component involve making direct electrical contact between the printer engine and the peripheral. In order to handle both communications and power transfer, at least four electrical contacts may be required. Typically, such contacts are rather delicate, as they must be manufactured with a high degree of mechanical precision in order to maintain a required level of compactness. Such contacts typically involve a sliding action during the connection and disconnection process. Although the sliding action tends to wipe away dirt and other contaminants at the contact site, thus improving the electrical connection, it also creates wear on plated materials. As the plating is worn away, exposing a base metal more prone to corrosion, contact reliability will degrade. Corrosion-related contact degradation may be exacerbated by the presence of ozone within the printer body. Ozone, a strong oxidizing compound, is generated during certain electrophotographic processes. If spring-type electrical contacts are employed to make the required connections, they may be subject to bending or other damage which would impair the reliability of the connection.

Consequences related to the foregoing problems can be anything from merely an annoyance to printer inoperability.

What is needed is a contactless connection system for providing power and communications coupling to a peripheral device on a replaceable printer component.

SUMMARY OF THE INVENTION

Replaceable printer components, such as toner cartridges, are generally located within and in contact with the printer engine. Contactless power and communications links are established between the replaceable component and the printer engine for peripheral devices installed on or within the replaceable component. Such peripheral devices may include, without limitation a microprocessor, a non-volatile memory, a toner quantity sensor, an environmental condition sensor, a photoconductor condition sensor, or a print quality sensor. For peripheral devices incorporated within or on the replaceable component, power is inductively transferred from a primary winding on the printer engine to an adjacent secondary winding on the replaceable component without the use of direct physical contact between electrical conductors. In addition, communications between the printer engine and at least one peripheral device on board the replaceable component are provided without making direct physical contact between electrical conductors. The communication task is accomplished in one of several ways. For a first embodiment of the invention, control signals are sent from the printer engine to the replaceable component over the inductive power coupling circuit by switching between two frequencies of alternating current applied to the primary winding on the printing engine. The frequency switching is decoded on board the replaceable component to provide control signals for the peripheral device. For example, the higher frequency alternating current may represent the sending of a "1", while the lower frequency alternating current may represent the sending of a "0". For communications in the opposite direction, the peripheral device may send information to the printer engine by modulating a resistive load coupled to the secondary winding. Current flow through the primary winding will vary in response to the load on the secondary winding. The variations in current flow on the printer engine side are decoded to signals which the printer engine comprehends. For a second embodiment of the invention, communications between the printer engine and one or more peripheral devices are independent of the inductive power coupling circuit. Individual signal lines are inductively coupled across a narrow gap. For a third embodiment of the invention, unidirectional communications are handled by a diode pair, one diode being a transmitter diode, the other being a receiver diode. For bidirectional communications, two diode pairs are utilized. For a preferred implementation of this latter arrangement, the diode transmitters and receivers operate in the infrared range of the electromagnetic spectrum, although other frequencies are also contemplated. Operating commands from the printer engine to the peripheral and information from the peripheral to the printer engine may be communicated over these communication links.

Because plain-paper copiers, facsimile machines and printers share many components in common, there has recently been a blurring of the distinction between those three types of machines. Combination units are produced by various manufacturers. Some types utilize laser or LED-based photocopy engines, while others rely on ink-jet technology. Because of this blurring that has occurred, the invention disclosed herein, though directed primarily to printer applications, is equally applicable to plain-paper copiers and facsimile machines which have replaceable printing components with on-board peripheral devices.

DETAILED DESCRIPTION OF THE INVENTION

Figure 1:
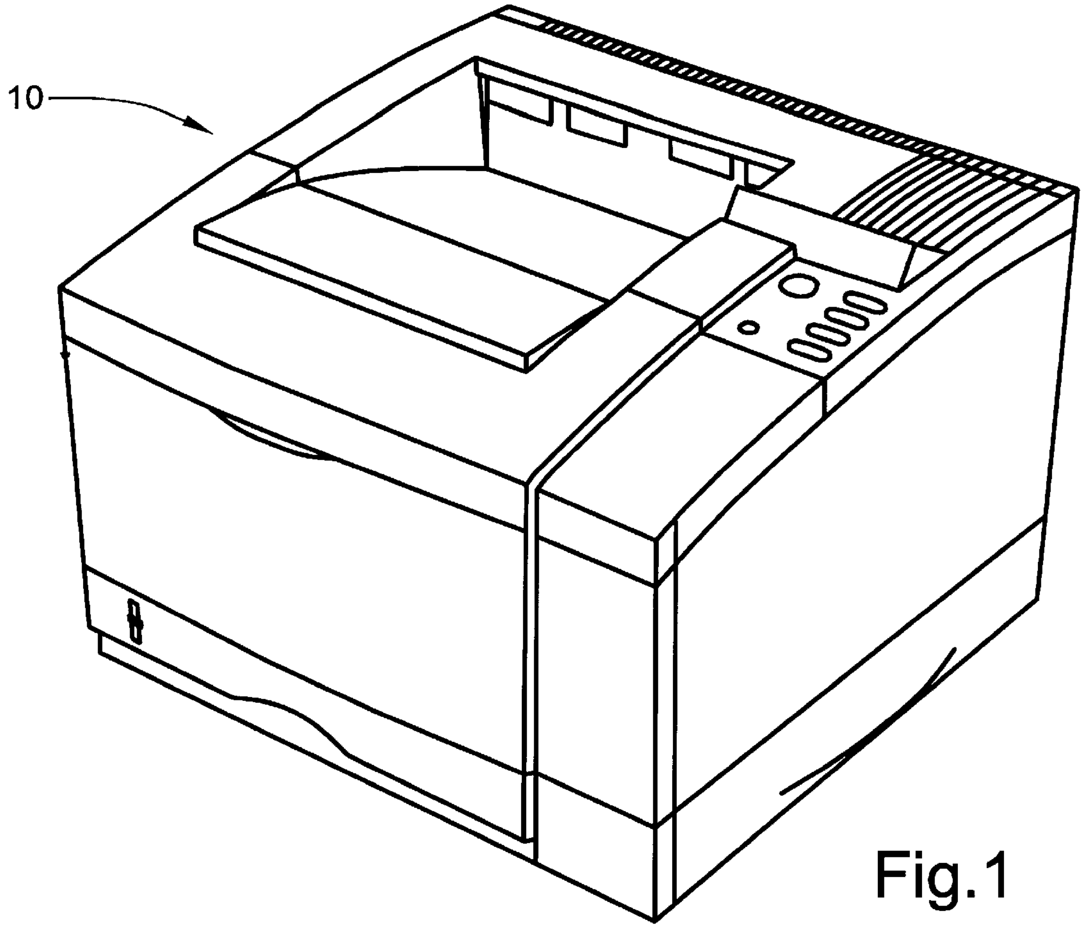
FIG. 1 is a perspective view of laser printer which requires a replaceable toner cartridge for operation.
Figure 2:
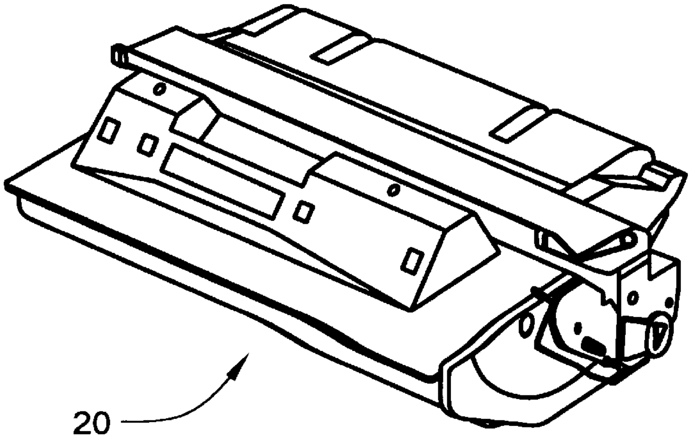
FIG. 2 is a perspective view of a toner cartridge which installs within the printer of FIG. 1.

The block diagram of FIG. 1 depicts a laser printer engine 10 of the type having a replaceable printer cartridge. FIG. 2 depicts a replaceable toner cartridge 20 of the type which installs within printer engine 10 such that the toner cartridge 20 is in physical contact with the printer engine. Although the invention is disclosed in the context of a laser printer engine having a removable toner cartridge, the invention is applicable to any removable printer component to which power must be supplied from the printer engine 10 to a peripheral device on a removable component such as a toner cartridge 20. Such peripheral devices may include, without limitation a microprocessor, a non-volatile memory, a toner quantity sensor, an environmental condition sensor, a photoconductor condition sensor, or a print quality sensor. It is intended that the term"printer engine" be broadly interpreted to include any imaging engine utilized in a laser printer, an inkjet printer, a facsimile machine, a plain paper copier, or any other system having printing capability. The invention is also applicable to any removable printer component for which unidirectional or bidirectional communications need be established between the printer engine 10 and a peripheral device on the removable component.

Figure 3:
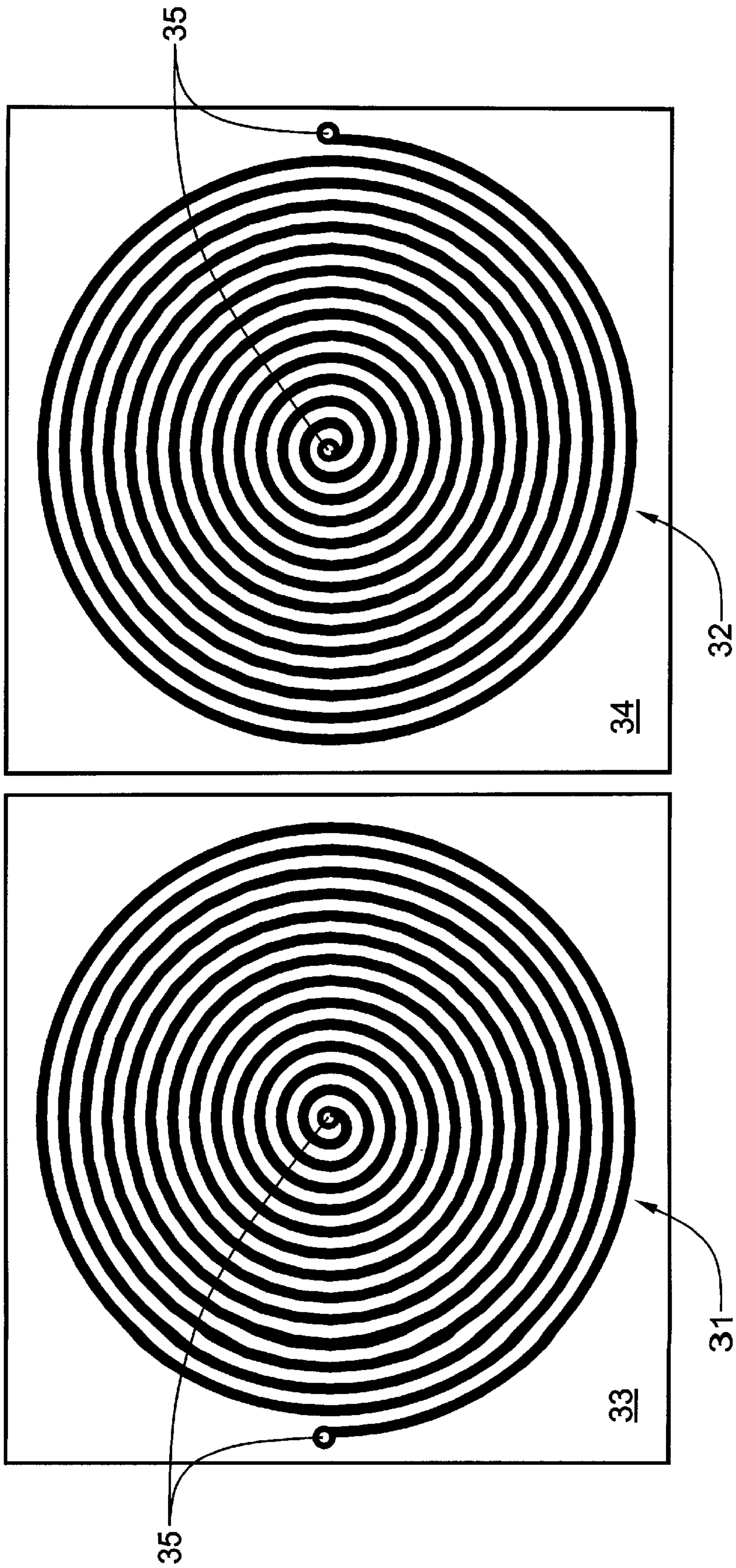
FIG. 3 is a top plan view of a pair of spiral inductors used for inductively-coupled power transmission.

Referring now to FIG. 3, a pair of spiral coils 31 and 32 are formed on a pair of insulated laminar substrates 33 and 34, respectively. The coils 31 and 32 may be formed from copper, aluminum, or any other suitable conductor. The substrates may be manufactured from semi-rigid materials such as ceramics or fiberglass-reinforced plastic, or flexible material such as polyester or acetate film. At least one of the coils 31 or 32 is covered with an insulating layer (not shown). Preferably, both coils 31 and 32 are covered with a tough insulating film. Mylar® film works well in this application, because its high tensile strength not only dielectrically insulates the coil, but protects it from mechanical damage, as well. Through-holes 35 allow connection to the back side of the substrates 33 and 34. Coil 31 is mounted on the printer engine 10, while the other coil 32 is mounted on the removable component. Each coil is preferably positioned such that when the removable printer component (in this particular example, the toner cartridge 20 is installed in the printer engine 10, coil 31 and coil 32 are face to face in parallel planes, axially aligned, and as physically close together as practicable. This is because Inductive coupling works best at short distances.

Figures 4, 5:
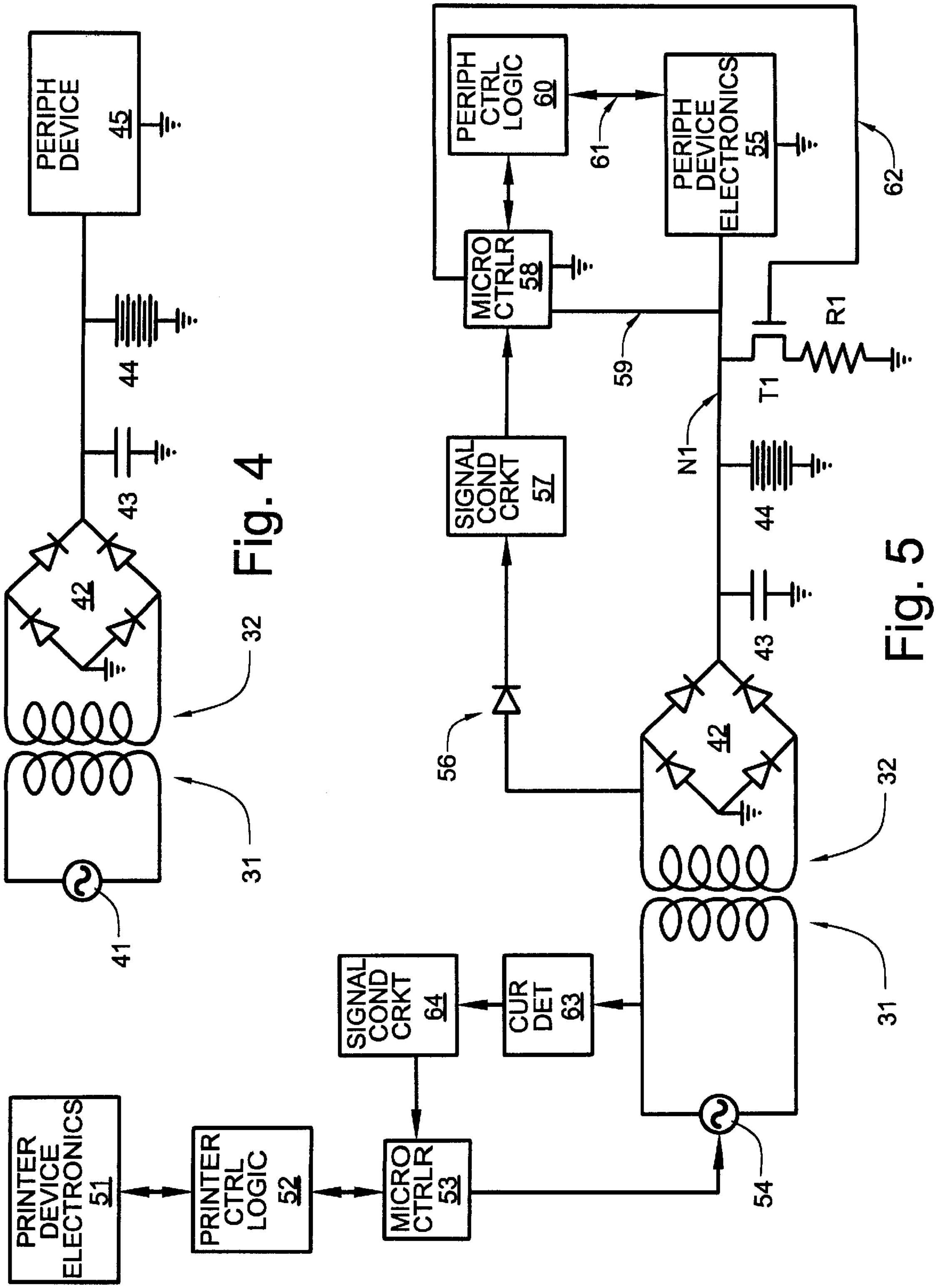
FIG. 4 is a block circuit diagram of a circuit used for inductively-coupled power transmission.
FIG. 5 is a block circuit diagram of a circuit used for both inductivelycoupled power transmission and bidirectional communication.

The block diagram of FIG. 4 depicts an example of an electrical circuit that may be used to inductively transmit power from the printer engine 10 to a removable printer component such as a toner cartridge 20. As heretofore explained, coil 31 and coil 32 are positioned such that they are positioned for optimum inductive coupling. An alternating current source 41 is coupled to coil 31. In order to further optimize inductive coupling in what is essentially an air-core transformer, alternating current within a frequency range of 20–30 kiloherz is used. It should be emphasized that although the stated frequency range is believed to be optimum for the particular application, other frequencies outside this stated range may also be used. The output from coil 32 is rectified by full-wave bridge rectifier 42 and filtered by capacitor 43. The rectified and filtered output is used to charge a battery 44, which provides power to the peripheral device 45.

Referring now to FIG. 5, the circuit of FIG. 4 has been modified so that bidirectional communications may be established between the printer engine 10 and the removable component. Communications sent from the printer engine to the peripheral device originate with the printer engine electronics 51. A control signal is sent from the printer electronics 51 to printer engine control logic 52. The control logic 52 sends a peripheral control signal to printer-side microcontroller 53. The microcontroller 53 outputs an enable signal which corresponds to the control signal bit stream. The enable signal is fed to alternating current source 54. The enable signal modulates the output of source 54 such that source 54 outputs a first frequency f1 (e.g., 22 kHz) when the enable signal is low and a second frequency f2 (e.g., 28 kHz) when the enable signal is high. A stream of serial binary data is thus encoded in terms of frequencies f1 and f2. The encoded alternating current is applied to coil 31. A portion of the alternating current induced in coil 32 is rectified by diode 56, which generates a series of DC pulses. These pulses are conditioned by a device-side signal conditioning circuit 57 and input to a device-side microcontroller 58. The microcontroller 58, which receives power via line 59, decodes the conditioned DC pulses received from the signal conditioning circuit 57 and, in response to the decoding process, generates control signals which are sent to peripheral control logic 60. The peripheral control logic sends signals which control the peripheral device electronics 55 onboard the replaceable component.

Still referring to FIG. 5, it may be necessary to establish communications in the opposite direction. Such a need may arise when data generated by the peripheral device electronics 55 must be communicated to the printer engine 10. For such a case, the peripheral device electronics 55 sends the data to the peripheral control logic 60, whence it is sent to microcontroller 58, which encodes the data in the form of signals which are sent to the gate of transistor T1 via line 62. By intermittently grounding node N1 through resistor R1, the resistive load on coil 32 is modulated. Current flow through the primary coil 31 will vary in response to the load on the secondary coil 32. The varying current is detected by a current detector circuit 63. The output from current detector 63 is conditioned by a printer-side signal conditioning circuit 64 and sent to printer-side microcontroller 53. The conditioned signals are decoded by the microprocessor 53 and sent to the logic circuitry 60 of the printer engine 10 to be processed for use by the printer electronics 51.

Figure 6:
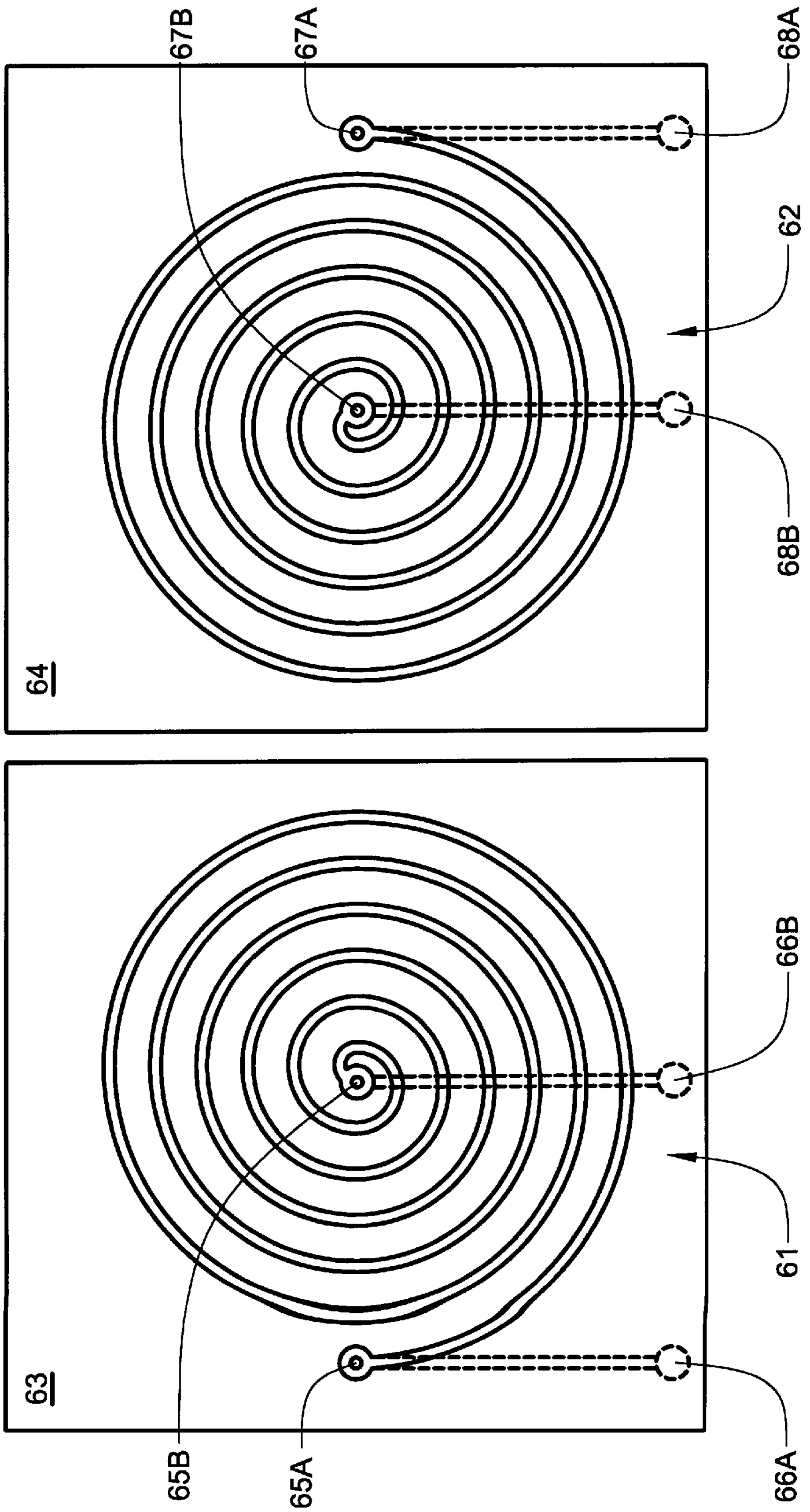
FIG. 6 is a top plan view of a pair of spiral coils used for communication signal.

Referring now to FIG. 6 a pair of spiral coils 61 and 62 are employed for inductive coupling of communications lines without direct electrical contact. As the inductive transfer of information requires only the detection of state changes and only minimal energy transfers, coils 61 and 62 have far fewer turns than coils 31 and 32. In other respects, coils 61 and 62 are very similar to coils 31 and 32. Coils 61 and 62 are also preferably formed as a metal traces on insulated laminar substrates 63 and 64. Connection to each coil is made on the back side of the substrates 63 and 64 via through-holes 65. To prevent shorting, at least one of the coils is covered with an insulating layer. Preferably, each coil is covered with an insulating layer.

Figure 7:
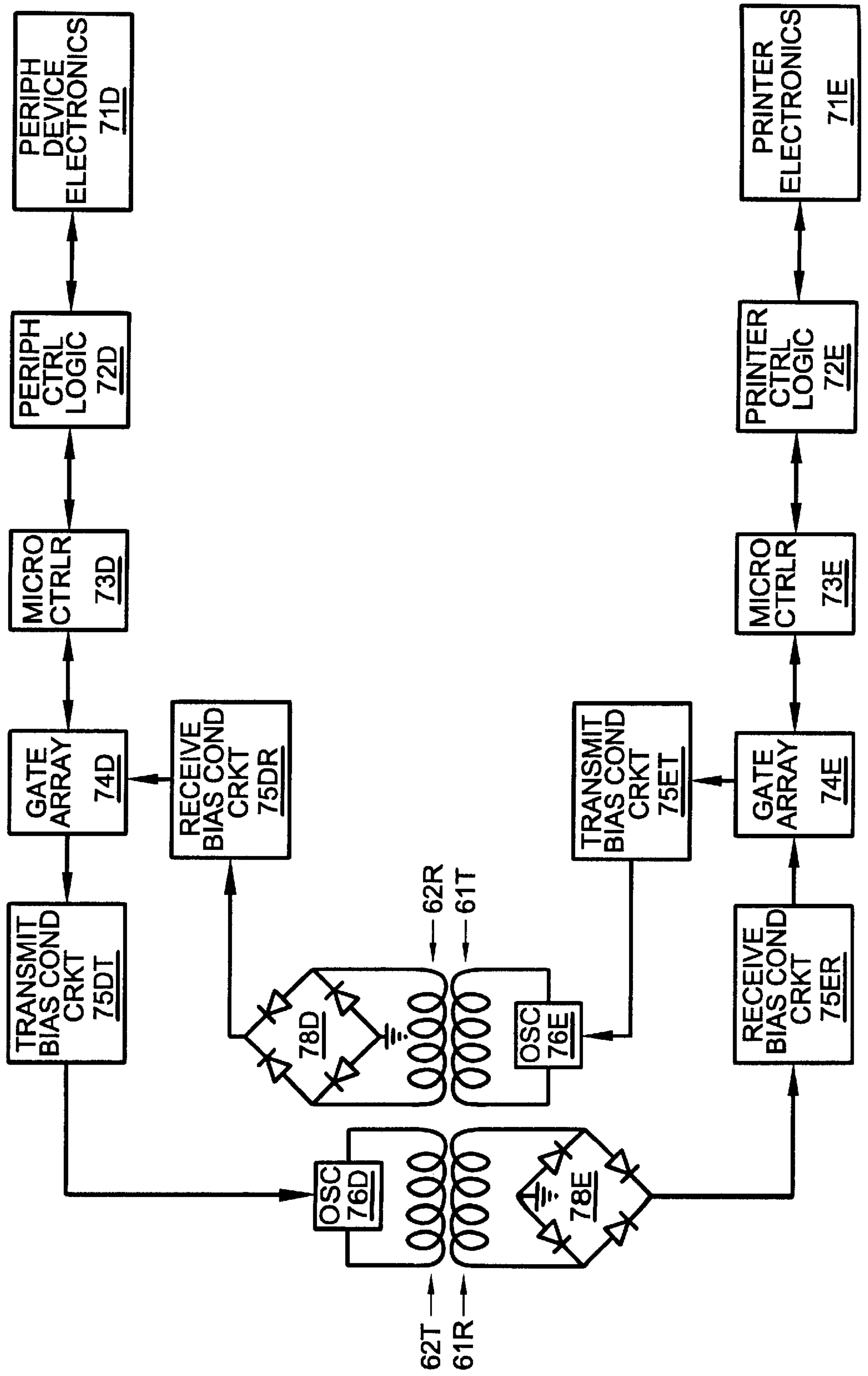
FIG. 7 is a block diagram of the circuitry utilized for an inductive communication link between a printer engine and a peripheral device.

Bidirectional inductively-coupled communications between a printer engine and a peripheral device onboard a replaceable printer component are implemented with the circuitry shown in FIG. 7. Inductive coupling is achieved using a pair of coils like the ones depicted in FIG. 6. Coil 61 is mounted on the printer engine 10, while coil 62 is mounted on the removable component. Each coil is positioned such that when the removable printer component (in this particular example, the toner cartridge 20) is installed in the printer engine 10, coil 61 and coil 62 are located in face to face in parallel planes, axially aligned, and as physically close together as practicable. Communications sent from the printer engine electronics to the peripheral device electronics originate with the printer engine electronics 71 E. A control signal is sent from the printer electronics 71 E to printer engine control logic 72E. The controller 72E communicates with a printer-side microcontroller 73E. Data is sent to a printer-side gate array 74E. Until this point, all data has been transmitted in parallel format. The printer-side gate array 74E converts the parallel control signals received form the microcontroller 73E to serial data which is sent to a printer-side transmit bias conditioning circuit 75ET. Constructed mainly from resistors and capacitors, conditioning circuit 75ET cleans up the serial signal pulses. The conditioned serial signal, which may be characterized as pulsating DC, is input to oscillator 76E as an enabling signal. Oscillator 76E intermittently produces an intermittent alternating current that has a frequency that is, preferably, at least an order of magnitude greater than the baud rate of pulsating DC signal input to oscillator 76E. The intermittent alternating current output from oscillator 76E is applied to coil 61T. Current induced in coil 62R is rectified by device-side rectifier 78D and conditioned by device-side receive bias conditioning circuit 75DR. The function of conditioning circuit 75DR, which is constructed from mainly capacitors and resistors, is to smooth out the wave form of individual high binary bits. Capacitances must be chosen with care, for if the signal is subjected to too much capacitance during the smoothing process, all the bits will be blurred together in an unreadable signal of more or less constant amplitude. The conditioned signal is fed to a device-side gate array 74D. The gate array 74D converts the serial pulses to parallel data and loads the data byte by byte into one of its registers. A device-side microcontroller 73D, upon being notified that an incoming byte is waiting in the register of gate array 74D, reads the byte and sends it over a 15-pin parallel interface to peripheral device control logic 72D. The control logic 72D issues the appropriate control signals for controlling the peripheral device electronics 71 D. For a presently preferred embodiment of the invention, microcontrollers 73E and 73D are both 8051×A microcontrollers.

Still referring to FIG. 7, communications in the reverse direction are handled in a similar manner, with the transmission path including transmit bias conditioning circuit 75DT, device-side oscillator 76D, coils 62T and 61 R, engine-side rectifier 78E, and receive bias conditioning circuit 75ER. Using this path, information from the peripheral device electronics 71 D can be communicated to the printer engine electronics 71 E.

Figure 8:
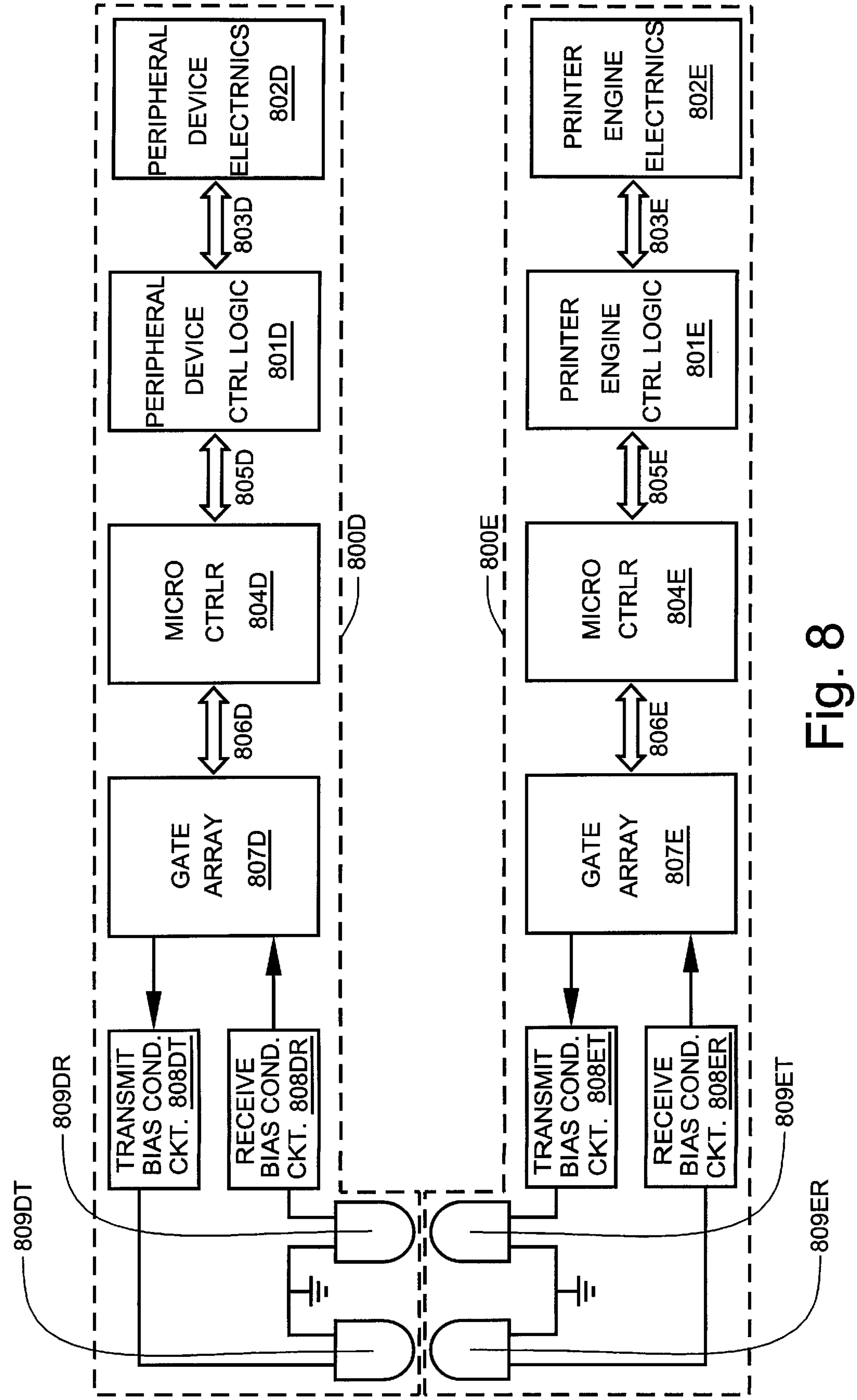
FIG. 8 is a block diagram of the circuitry utilized for an infrared communication link between a printer engine and a peripheral device.

Referring now to FIG. 8, a pair of infrared radiation links are utilized for bidirectional communications between printer engine electronics 802E and peripheral device electronics 802D. It will be noted that the printer-side circuitry 800E is essentially a mirror image of the peripheral device circuitry 802D. Information is communicated serially over a narrow gap between a pair of infrared radiation diodes 809ER and 809ET on the printer engine side and a pair of infrared radiation diodes 809DR and 809DT on the peripheral device side. Communications originating from the printer engine and received by the peripheral device electronics will be described first. The printer engine electronics 802E communicate over a parallel bus 803E with printer engine control logic 801 E. The printer engine controller, in turn, communicates with a printer-side microcontroller 804E over a 15-pin parallel interface 805E. Data is sent to a printer-side gate array 807E over a parallel bus 806E. For the transmission of control signals to the peripheral device, the printer-side gate array 807E converts the parallel control signals to serial data which is sent to a printer-side transmit bias conditioning circuit 808ET. Constructed mainly from resistors and capacitors, conditioning circuit 808ET cleans up the serial signal pulses. The conditioned serial signal is input to a printer-side transmitting infrared light-emitting diode 809ET. The infrared signal is received by a device-side receiving infrared diode 809DR, conditioned by a device-side receive bias conditioning circuit 808DR, and fed to a device-side gate array 807D. The gate array 807D converts the serial pulses to parallel data and loads the data byte by byte into one of its registers. The microcontroller 804D, upon being notified that an incoming byte is waiting in the register of gate array 807D, reads the byte over parallel bus 806D, and sends it over a 15-pin parallel interface 805D to peripheral device control logic 801 D. The control logic issues the appropriate control signals for controlling the peripheral device electronics 802D. For a presently preferred embodiment of the invention, microcontrollers 804E and 804D are both 8051×A microcontrollers.

Still referring to FIG. 8, communications in the reverse direction are handled in a similar manner, with the transmission path including transmit bias conditioning circuit 808DT, infrared diodes 809DT, 809ER and receive bias conditioning circuit 808ER. Using this path, information from the peripheral device electronics 802D can be communicated to the printer engine electronics 802E.

Although only several embodiments of the new system for non-contacting communication and power interface between a printer engine and one or more peripheral systems attached to a replaceable printer component are described herein, it will be obvious to those having ordinary skill in the art that changes and modifications may be made thereto without departing from the scope and the spirit of the invention as hereinafter claimed. For example, though not specifically disclosed, communications between the printer engine and the peripheral device could also be carried out using electromagnetic radiation other than that of infrared frequencies.

What is claimed is:

1. A contactless interface between an imaging engine and a component removably attached to said imaging engine, said component having at least one onboard peripheral device which requires a source of electrical power, said interface comprising:

an alternating current source alternately operable at first and second frequencies;

a first coil onboard the imaging engine coupled directly to said alternating current source;

a second coil onboard the removable component being inductively coupled to said first coil such that a current is induced therein in response to the flow of alternating current in said first coil, said induced current being employed to power said peripheral device; and a system for establishing data communications between said peripheral device and said imaging engine, said system having means for modulating the frequency of the applied alternating current between said first and second frequencies in response to communications signals received from the imaging engine; and means for decoding the frequency modulations of the induced current and delivering information thus decoded to the peripheral device.

2. The contactless interface of claim 1, wherein said means for modulating comprises a frequency select signal coupled to said alternating current source, said frequency select signal being responsive to communications signals received from said imaging engine.

3. The contactless interface of claim 1, wherein said means for decoding comprises:

a rectifier which converts the induced alternating current to DC pulses; and

A microcontroller which receives the DC pulses, samples the frequency of those pulses, and decodes the DC pulses into communications signals which are then transmitted to the peripheral device.

4. The contactless interface of claim 1, which further comprises:

means for modulating the resistive load on said second coil in response to communications signals received from said peripheral device;

means for detecting current flow variations through said first coil as a consequence of the modulating of the resistive load on said second coil;

means for decoding detected current flow variations through said first coil and into communications signals which are then transmitted to the imaging engine.

5. A contactless interface between an imaging engine and a component removably attached to said imaging engine, said component having at least one onboard peripheral device which requires a source of electrical power, said interface comprising:

an alternating current source;

a first coil onboard the imaging engine coupled directly to said alternating current source;

a second coil onboard the removable component being inductively coupled to said first coil such that a current is induced therein in response to the flow of alternating current in said first coil, said induced current being employed to power said peripheral device; and a system for establishing data communications between said peripheral device and said imaging engine, said system relying on inductive coupling that is independent of the inductively-coupled power link provided by first and second coils.

6. The contactless interface of claim 5, wherein said system for establishing data communications comprises:

a printer-side oscillator which receives a serial enable signal responsive to communications signals issued by the imaging engine;

a printer-side transmit coil coupled to said printer-side oscillator;

a peripheral-side receive coil inductively coupled to said printer-side transmit coil when said replaceable component is attached to said imaging engine;

a peripheral-side rectifier coupled to said peripheral-side coil for rectifying current induced in said peripheral-side receive coil;

means for decoding the rectified current from said peripheral-side receive coil to produce a communication signal which can be read by and acted upon by the peripheral device.

7. The contactless interface of claim 6, wherein said means for decoding is a microprocessor coupled to both said peripheral-side rectifier and said peripheral device.

8. The contactless interface of claim 6, wherein said system for establishing communications further comprises:

a peripheral-side oscillator which receives a serial enable signal responsive to communications signals issued by the peripheral device;

a peripheral-side transmit coil coupled to said peripheral-side oscillator;

a printer-side receive coil inductively coupled to said peripheral-side transmit coil when said replaceable component is attached to said imaging engine;

a printer-side rectifier coupled to said printer-side coil for rectifying current induced in said printer-side receive coil;

means for decoding the rectified current from said printer-side receive coil to produce a communication signal which can be read by and acted upon by the peripheral device.

9. The contactless interface of claim 8, wherein said means for decoding is a microprocessor coupled to both said peripheral-side rectifier and said peripheral device.

10. The contactless interface of claim 5, wherein said system for establishing data communications comprises a first electromagnetic radiation communications link which provides unidirectional coupling of communication signals from imaging engine electronics to peripheral device electronics when said replaceable component is attached to said imaging engine.

11. The contactless interface of claim 10, wherein said system for establishing data communications further comprises a second electromagnetic radiation communications link which provides unidirectional coupling of communication signals from peripheral device electronics to imaging engine electronics when said replaceable component is attached to said imaging engine.

12. The contactless interface of claim 11, wherein said first and second electromagnetic radiation links operate in the infrared frequency band.

13. The contactless interface of claim 12, wherein said first and second electromagnetic radiation links operate in a serial data mode.

14. The contactless interface of claim 13, wherein first and second infrared radiation communication links are implemented as a first transceiver on the printer side and a second transceiver on the peripheral side, said first transceiver comprising a printer-side light-emitting diode and a printer-side light-receptor diode, both printer-side diodes being coupled to printer control logic via a first gate array and a first microcontroller, and said second transceiver comprising a peripheral-side light-emitting diode and a peripheral-side light-receptor diode, both peripheral-side diodes being coupled to peripheral control logic via a second gate array and a second microcontroller, said first and second gate arrays performing both serial to parallel and parallel to serial data conversions.

15. A contactless interface between an imaging engine and a component removably attached to said imaging engine, said component having at least one onboard peripheral device which requires both a source of electrical power and communications with said imaging engine, said interface comprising:

an alternating current source;

a first coil onboard the imaging engine coupled directly to said alternating current source;

a second coil onboard the removable component, said second coil having a resistive load and being inductively coupled to said first coil such that a current is induced therein in response to the flow of alternating current in said first coil, said induced current being employed to power said peripheral device; and a system for establishing data communications between said peripheral device and said imaging engine, wherein said resistive load is modulated in response to communication signals from said peripheral device, and variations in current flow through said first coil are detected and decoded so as to recreate the communication signals from said peripheral device, which recreated signals are transmitted to the imaging engine.

16. A contactless interface between an imaging engine and a component removably attached to said imaging engine, said component having at least one onboard peripheral device which requires both a source of electrical power and communications with said imaging engine, said interface comprising:

an alternating current source;

a first coil onboard the imaging engine coupled directly to said alternating current source;

a second coil onboard the removable component, said second coil having a resistive load and being inductively coupled to said first coil such that a current is induced therein in response to the flow of alternating current in said first coil, said induced current being employed to power said peripheral device; and a system for establishing data communications having at least one inductive link independent of the inductively-coupled power link provided by said first and second coils.

* * * * *